US000001914H

United States Statutory Invention Registration [19]

[11] Reg. Number: H1,914

Watkins [45] Published: Nov. 7, 2000

[54] METHOD AND SYSTEM FOR MITIGATION OF IMAGE DISTORTION DUE TO OPTICAL TURBULENCE

[75] Inventor: Wendell Watkins, El Paso, Tex.

[73] Assignee: The United States of America as represented by the Secretary of the Army, Washington, D.C.

[21] Appl. No.: 08/942,186

[22] Filed: Oct. 1, 1997

Related U.S. Application Data

[63] Continuation of application No. 08/687,069, Jul. 8, 1996, abandoned.

[51] Int. Cl.[7] ..... H04N 7/18

[52] U.S. Cl. ..... 348/143

[58] Field of Search ..... 348/25–30, 46–47, 348/31, 139, 143, 134; 250/201.1, 201.9, 202, 550; 356/4.01, 12

[56] References Cited

U.S. PATENT DOCUMENTS 5,093,563 3/1992 Small et al. ..... 250/201.9
5,469,250 11/1995 Holmes ..... 356/28

OTHER PUBLICATIONS

Kanade, "Development of a Video–Rate Stereo Machine", Nov. 14, 1994.
Sadot et al., Restoration of Thermal Images Distorted by the Atmosphere, Based on Measured and Theoretical Atmospheric Modulation Transfer Function, Jan. 1994.
H. van der Elst et al., Modelling and Restoring Images Distorted by Atmospheric Turbulence, COMSIG, pp:162–167 Feb. 1994.
Bhavnagri, Models fro Recognition and Correspondence Matching of Objects, pp: 563–543 1996.
Salerno, Neural Nets WIRN VIETRI–95, World Scientific, pp: 215–225 May 18, 1995.

*Primary Examiner*—Daniel T. Pihulic
*Attorney, Agent, or Firm*—Paul S. Clohan

[57] ABSTRACT

A passive method and system for mitigating image distortion due to optical turbulence in a surveillance system is disclosed. An array of cameras forming a stereo camera array is employed to view a distant object or objects and background to obtain multi-hyperstereo image data, and the latter data are processed in accordance with statistical comparison and integration techniques to mitigate the effects of optical turbulence in near real-time. Further features of the invention involve comparison of multi-hyperstereo images with uncorrelated optical turbulence distortions, the reconstruction of the distant object and background using segmenting and time-integration techniques, and the execution of time-averaging and correlation algorithms.

20 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND SYSTEM FOR MITIGATION OF IMAGE DISTORTION DUE TO OPTICAL TURBULENCE

"This application is a continuation, of application Ser. No. 08/687,069, filed Jul. 8, 1996 now abandoned."

GOVERNMENTAL INTEREST

The invention described herein may be manufactured, used and licensed by or for the United States Government without payment to me of any royalty thereon.

BACKGROUND OF THE INVENTION

1. Cross-reference to Related Applications

The subject matter of this application is related to that disclosed in copending applications application Ser. No. 08/633,712, now U.S. Pat. No. 5,756,990, filed on Apr. 17, 1996.

2. Field of the Invention

The present invention generally relates to a multi-hyperstereo method and system for the mitigation of image distortion from optical turbulence.

3. Description of the Prior Art

In the areas of horizontal, passive surveillance and target acquisition/identification, optical turbulence distortions can severely affect visible imagery and can significantly affect thermal imagery, especially when levels of identification are sought using modern improved resolution systems. If the current trend toward higher resolution for longer range detection continues, the impact of optical turbulence will increase as well. The adaptive optics approach used in astronomy does not have a counterpart for horizontal paths (that is, horizontal surveillance and target acquisition/identification) because there are no stars or guide stars to be used to drive a corrective mirror. The use of frame subtraction techniques does not work because of the random distortions of scene features occurring in individual images, as well as the long time intervals for obtaining average image blur.

One approach that has been used for the mitigation of aerosol-induced image blur involves a long-term (tens of seconds) time-average measurement of the aerosol modulation transfer function (MTF) that can be applied in near real-time to subsequent images because of the uniform nature of the scattering blur. See D. Sadot, et al., "Restoration of Thermal Images Distorted by the Atmosphere, Based on Measured and Theoretical Atmospheric Modulation Transfer Function," OPT.ENG. 33(1), pp. 44–53 (January 1994). However, the random nature of the optical turbulence distortions does not lend itself to the application of long-term, time-averaged MTF corrections of individual frames.

Experimental results showed that the use of hyperstereo imaging produced appreciable reduction of the optical turbulence distortions on objects viewed at 1-Km range with 10X visible stereo cameras with a 10-m platform separation. If a linear (or possibly area) array of cameras were used to view distant terrain, statistical comparison and integration of the multi-hyperstereo imagery could be used to mitigate the effects of optical turbulence in near real time. For example, if 1-m spacing between the individual cameras were used, the imagery would have comparable optical distortion statistics along the different camera lines-of-sight; but they would be uncorrelated.

The level of effort required to fully field the hardware and software necessary for such a technique is substantial due to the complexity of replicating, with appropriate algorithms, the manner in which human processing of live stereo video reduces the effects of optical turbulence distortions. The means of statistically averaging and correlating multiple line-of-sight imagery is even more complicated. However, the problem does not appear to be totally intractable because stereo vision is already being used in robotics for depth perception, although the ranges that are currently being used are only tens of meters, rather than hundreds of meters. See Takeo Kanade, "Development of a Video-Rate Stereo Machine," *Proceedings of* 94 *ARPA Image Understanding Workshop*, Nov. 14–16, 1994, Monterey, Calif.

Accordingly, it is clear that the areas of both surveillance and target acquisition/identification would be significantly benefitted by the reduction of the effects of optical turbulence distortion in terms of increased range and better target identification. This benefit is especially true for future aided target recognition systems. A passive technique would make the user of such surveillance and target acquisition/identification systems less detectable, as compared to the "active system" approaches.

SUMMARY OF THE INVENTION

The present invention generally relates to a passive method and system for multi-hyperstereo mitigation of image distortion due to optical turbulence in a surveillance setting.

More particularly, the invention relates to a method of mitigating image distortion due to optical turbulence in a surveillance system, the method comprising the provision of an array of cameras forming a stereo camera array, the employment of the stereo camera array to view a distant object or objects and background to obtain multi-hyperstereo image data, and the processing of the multi-hyperstereo image data in accordance with statistical comparison and integration techniques to mitigate the effects of optical turbulence in near real-time.

The invention also relates to a system for the mitigation of image distortion due to optical turbulence in a surveillance system, the inventive system comprising an array of cameras forming a stereo camera array, means for controlling the stereo camera array to view a distant object or objects and background to obtain multi-hyperstereo image data, and a processor for processing the multi-hyperstereo image data in accordance with statistical comparison and integration techniques to mitigate the effects of optical turbulence in near real-time.

Preferred embodiments of the invention process the hyperstereo image data with uncorrelated optical turbulence distortions, and also carry out reconstruction of the distant object or objects and the background. Moreover, the reconstruction techniques employed preferably comprise segmenting and time-integrating object edges and textures with correlations from subsequent multi-hyperstereo image data to reconstruct a stereo image of the distant object or objects and background, with substantial mitigation of distortions due to optical turbulence. Time-averaging and correlation algorithms are, preferably, employed.

Therefore, it is a primary object of the present invention to provide a method and system for mitigating image distortion due to optical turbulence in a surveillance system.

It is an additional object of the present invention to provide a method and system which employs stereo cameras in an array to view a distant object or objects and background to obtain multi-hyperstereo image data.

It is an additional object of the present invention to provide a method and system wherein multi-hyperstereo image data is processed in accordance with statistical comparison and integration techniques to mitigate the effects of optical turbulence in near real-time.

It is an additional object of the present invention to provide a method and system wherein multi-hyperstereo image data are compared with uncorrelated optical turbulence distortions.

It is an additional object of the present invention to provide a method and system of mitigating image distortion due to optical turbulence, wherein the distant object or objects and background are reconstructed.

It is an additional object of the present invention to provide a method and system of mitigating image distortion due to optical turbulence, wherein reconstruction of the distant object or objects and background is carried out by segmenting and time-integrating object edges and textures with correlations from subsequent multi-hyperstereo image data.

It is an additional object of the present invention to provide a method and system for mitigating image distortion due to optical turbulence involving the execution of time-averaging and correlation algorithms.

The above and other objects, and the nature of the invention, will be more clearly understood by reference to the following detailed description, the appended claims, and the accompanying drawings.

DETAILED DESCRIPTION

The invention will now be described in more detail with reference to the figures of the drawings.

Figure 1:
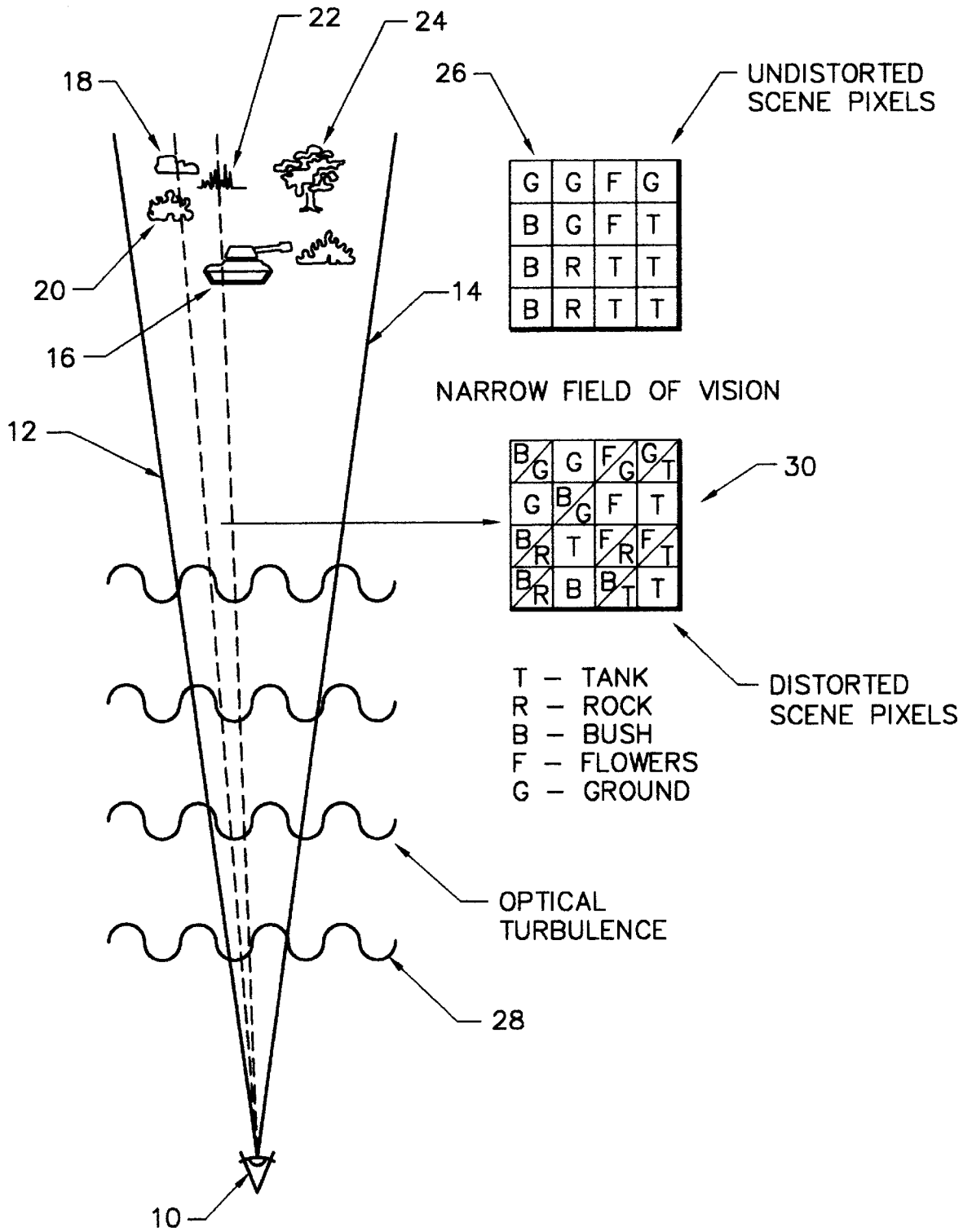
FIGURE 1 (PRIOR ART)
FIG. 1 is a diagrammatic representation of a conventional single line-of-sight arrangement for surveillance and/or identification of distant objects.

FIG. 1 is a diagrammatic representation of a conventional single line-of-sight arrangement for surveillance and/or identification of distant objects.

As seen therein, a viewer 10 is positioned so as to have a field of view, defined by left limit 12 and right limit 14. Within the field of view 12, 14 of the viewer 10, various objects are located. Specifically, using a military situation or battlefield situation as an example, within the field of view 12, 14 of the viewer 10, there may be a tank 16, rock 18, bush 20, and flowers 22, all found on an overall plot of ground 24.

Without distortion due to optical turbulence, the viewer 10 has an undistorted view of the aforementioned objects. The table 26 shown in FIG. 1 represents a set of picture elements or pixels, arranged in a 4×4 array, without any distortion due to optical turbulence. Thus, the ground 24 is clearly seen in the first pixel in the upper left hand comer of table 26, bush 20 is clearly seen in the second, third and fourth pixels of the first column of table 26, ground 24 is clearly seen in the first and second pixels in the second column of table 26, rock 18 is clearly seen in the third and fourth pixels in the second column of table 26, and so forth for flowers 22, tank 16 and ground 24 in the remaining two columns of table 26.

When optical turbulence 28 is introduced at a point between the viewer 10 and the aforementioned objects 16, 18, 20, 22 and 24, distortion of the image results. The distorted image is represented by table 30 in FIG. 1, in which many (but usually not all) of the pixels are distorted. Thus, the first pixel in the first column of table 30 provides a view of both the bush 20 and the ground 24 due to distortion, the third and fourth pixels in the first column of table 30 provide a distorted view of the bush 20 and rock 18, and so forth for the remaining three columns of table 30.

Figure 2:
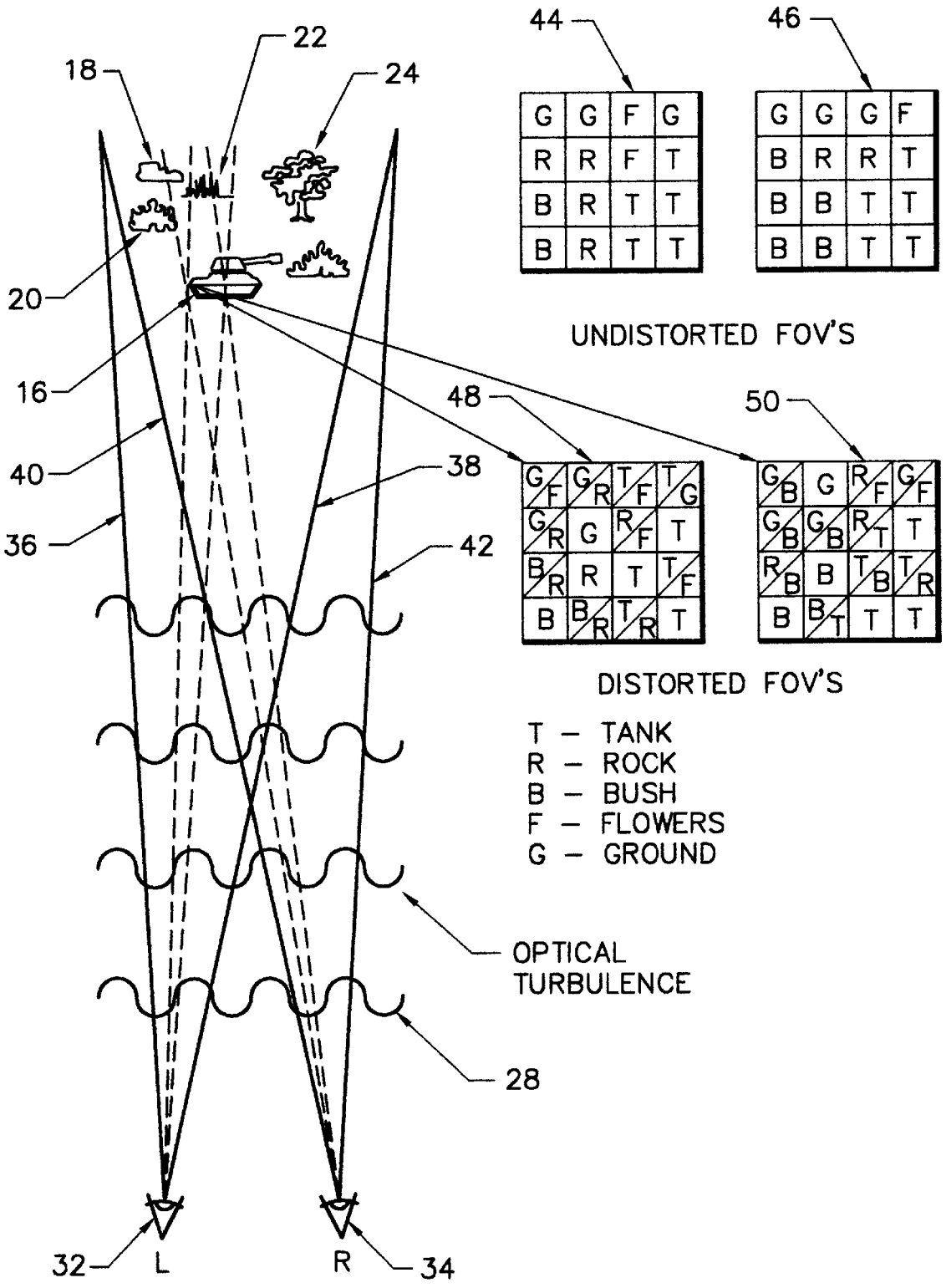
FIG. 2 is a diagrammatic representation of a multi-hyperstereo imaging arrangement in accordance with the present invention.

FIG. 2 is a diagrammatic representation of a multi-hyperstereo imaging arrangement in accordance with the present invention. Since portions of FIG. 2 are common to FIG. 1, common elements have been identified by identical reference numerals in FIGS. 1 and 2.

As seen in FIG. 2, imagers 32 and 34 are separated by a certain distance (preferably, up to fifty meters) and are equipped with high-powered telescopes for viewing at typical ranges (for example, battlefield ranges of 0.5–4 kilometers). The field of view of imager 32 is defined by left and right limit lines 36 and 38, respectively, while the field of vision of imager 34 is defined by left and right limit lines 40 and 42, respectively. The objects being viewed are identical to those being viewed in the monocular arrangement of FIG. 1, and are identified by identical reference numerals 16, 18, 20, 22 and 24.

Without any distortion due to optical turbulence, imagers 32 and 34 have undistorted views of the latter objects, as indicated by table 44 (for imager 32) and table 46 (for imager 34). However, when optical turbulence 28 is introduced at a position between imagers 32 and 34, on the one hand, and the objects 16, 18, 20, 22 and 24, on the other hand, the pixel array for imager 32, as represented by table 48, is distorted, and the pixel array for imager 34, as represented by table 50, is also distorted.

In accordance with the present invention, correlation of edges and textures of pairs of stereo images can be utilized to reduce or eliminate distortion, thereby isolating an object or objects from its or their background. That is to say, by employing a multi-hyperstereo imaging arrangement in accordance with the present invention, a substantial reduction in the distorting effects of optical turbulence 28 over that observed through a single, monocular channel or field of view (as seen in FIG. 1) can be achieved.

Figure 3:
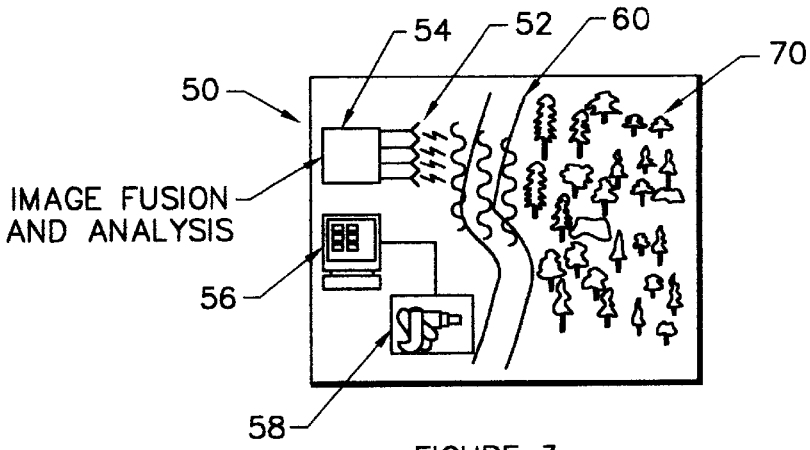
FIG. 3 is a diagrammatic representation of a typical wide baseline, multi-hyperstereo imaging arrangement in accordance with the present invention.

FIG. 3 is a diagrammatic representation of a typical wide baseline, multi-hyperstereo imaging arrangement in accordance with the present invention. As seen therein, the multi-hyperstereo imaging system 50 is positioned in opposition to a collection of targets 70 arranged in a cluttered background, and optical turbulence 60 is introduced between the system 50 and the targets 70.

The multi-hyperstereo imaging system 50 comprises an array 52 of remotely controlled, passive image sensors, an image fusion and analysis processor 54, a display unit 56, and a stereo vision headset 58 worn by a user.

Preferably, the image sensor array 52 comprises a plurality (preferably, up to eight) image sensors consisting of conventional camera platforms and controllers. Image fusion and analysis processor 54 is any conventional computer or microprocessor which is appropriately programmed in accordance with the flow chart of operations disclosed herein and discussed below. Similarly, display unit 56 is any conventional display unit for receiving and displaying any information provided by processor 54. Finally, stereo vision headset 58 is a conventional stereo vision headset. For example, stereo vision headset 58 can be implemented by a Binocular/Stereoscopic Development Kit, Model DK210, manufactured by Virtual Vision, Inc. of Redmond, Wash.

In operation, objects within the field of vision (FOV) of the image sensor array 52 are detected, resulting in the generation of image data by the image sensor array 52. The image data are provided to the image fusion and analysis processor 54 which, in accordance with the flowchart of operations discussed below, processes the image data, and provides resultant display data to display unit 56 and stereo vision headset 58 worn by a user of the system.

Figure 4:
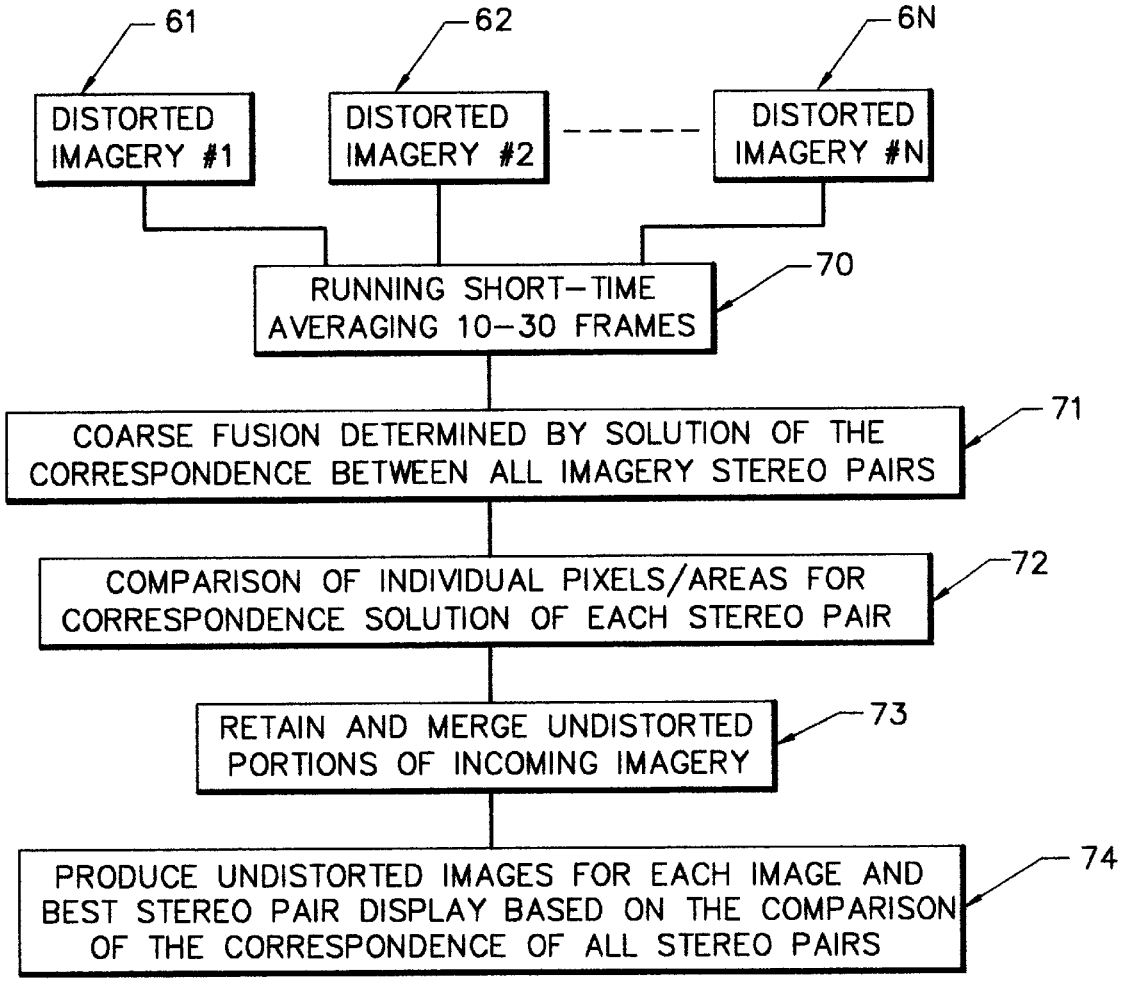
FIG. 4 is a flowchart of the operations performed by the image fusion and analysis processor of the multi-hyperstereo imaging system of the present invention.

FIG. 4 is a flowchart of the operations performed by the image fusion and analysis processor of FIG. 3. As seen therein, distorted imagery data are derived by the plurality of sensors in the image sensor array 52 (FIG. 3), derivation of such distorted imagery data being indicated in blocks 61, 62, . . . , 6N of FIG. 4.

The distorted imagery data are then subjected to a running short-time averaging process involving, in the preferred embodiment, 10–30 frames (see block 70). That is to say, the imagery data from each of the plurality of sensors in image sensor array 52 are averaged to obtain a blurred image of the scene. This can be done on a "running update" basis for, typically, 10–30 frame averages.

For example, thirty frames can be averaged, and then, when the next frame is received, the first frame of the original thirty frames is dropped, and the most recently received frame is added to fill out the thirty frames, which are then again averaged, and so forth. Alternatively, a given number of frames (e.g., thirty frames) are averaged, and then the process is paused so as to wait for the next set of frames, and those frames are then averaged. Once the averaging process is performed, the images can be compared, in the next step of the process, to obtain range mapping of prominent features and textures in the scene, as will now be discussed.

The results of the short-time averaging process are then subjected to a coarse fusion process determined by the solution of the correspondence between all imagery stereo pairs (see block 71). More specifically, several possible algorithms can be used to determine the solutions of the correspondence between all of the image pairs in the multi-hyperstereo imagery process. This amounts to a determination of the offset of individual pixels or pixel areas between image pairs.

One possible method for performing a coarse fusion determination is by comparison of the sum of the squares of the differences between the intensity distribution of a small area in one image with its best fit in a second image. This process can be performed for individual pixels or for small averaged areas of pixels. The combination of the solutions of all stereo pairs in the array will provide a coarse fusion (that is, a set of blurred images) for all prominent features and textures in the scene. In other words, as a result of the coarse fusion process, certain prominent features can be distinguished from other prominent features (e.g., a tree can be distinguished from a tank or a rock).

Then, individual pixels/areas of the FOV are compared for correspondence solution of each stereo pair (see block 72). That is to say, the correspondence can be applied to incoming or previously collected sets of array images collected at the same time. The comparison of individual pixels or pixel areas is performed on all pairs of stereo images for the array using the coarse fusion technique, as previously described, and as a result the search areas of consideration for comparison of individual pixels or pixel areas can be narrowed. The unaveraged images will have sharper feature and texture content, although they will be more distorted than the short-time averaged images, and will perhaps require a different matching algorithm relative to the algorithm used in the coarse fusion process (the "sum of squared differences" algorithm previously mentioned). A determination of non-distortion is made by comparing pixel areas between stereo image pairs based on the coarse fusion solution and overlap with previously retained undistorted images for the cases where occlusions of pixels or pixel areas occur. This process could, for example, employ a neural net approach to reduce the number of incorrectly retained pixels or pixel areas. The neural net approach previously referred to is a conventional algorithm which can be used to fill in blanks in intermittent data. More specifically, the neural net approach is a conventional statistical technique for determining correctness or adding weight to the correct choice of undistorted pixel areas.

Undistorted portions of the incoming imagery data are retained and merged (block 73), and undistorted images are produced for each image and the best stereo pair displayed based on the comparison of the correspondence of all stereo pairs (see block 74). That is to say, once undistorted images have been obtained for each of the images of the array, those images can be used to produce a stereo pair for display using the best angular separation for showing depth at a specified range and depth of field. In addition, the images in the array can be used to fill in portions of the images where occlusions occur when comparing individual lines of sight due to close-in objects, like branches, that block portions of scene features within a range band in an uncorrelated fashion.

Referring now to FIG. 2, it will be recalled that tables 44 and 46 represent data detected in undistorted FOV's, each comprising a 4×4 pixel area region, for left and right imagers, respectively. Similarly, tables 48 and 50 represent image data derived for distorted FOV's, again comprising a 4×4 pixel area region, for left and right imagers, respectively.

Referring to tables 44 and 46, if the imagery FOV's have no distortion, then the fusion process performed by image fusion and analysis processor 54 of FIG. 3 provides exact solutions to the correspondence for the imagery resolution and depth perception. Thus, in tables 44 and 46 of FIG. 2, a 4×4 pixel area region is given for left and right FOV's, wherein some of the pixel areas contain the same terrain feature and some do not. The aforementioned short-time image averaging process (referred to above with respect to block 70 of FIG. 4) can be used to obtain fusion of the overall scene content. This permits determination of a match between the content of the individual pixel areas and what that content should be.

For example, the upper left pixel area in each of tables 44 and 46 (left and right vision) contains the same indication—ground (G). However, the corresponding distorted pixel areas in tables 48 and 50 contain a mixture of ground (G) and flowers (F) in table 48 and ground (G) and bush (B) in table 50. In the latter case, there is no fusion match, and the distorted pixel areas are discarded in accordance with the present invention.

The next pixel area to the right in the top row of each of tables 48 and 50 has a mismatch for the left image sensor (G/R in table 48, second column, first row) and a match for the right image sensor (in table 50, second column, first row). Nevertheless, the data for both pixel areas are discarded in accordance with the present invention.

Further referring to tables 48 and 50, the rightmost pixel area in the second row (fourth column, second row) in both tables 48 and 50 indicates a tank (T). It should be noted that a tank (T) is also indicated in the corresponding pixels (fourth column, second row) of tables 44 and 46 representing undistorted image data. Thus, in this case, both pixel areas match what they are supposed to be based on the time-averaged fusion correspondence, and they are retained.

Next, the second pixel area from the left in the third row (second column, third row) of each table represents a pixel area that gives depth perception to the tank because, at the edge of the tank, there is different terrain seen from the two FOV's along the imager lines of sight. In this case, the rock (R) (table 48, second column, third row) matches what it is supposed to be (as indicated by the second column, third row of table 44), and the bush (B) appearing in table 50 (at second column, third row) matches what it is supposed to be (as indicated in table 46, second column, third row). Thus, both pixel areas, although different from each other, are retained.

Referring to the last row of each table, the leftmost pixel area (first column, fourth row) indicates a bush in table 48 and in table 50, and this matches the corresponding undistorted indications in tables 48 and 46, respectively. Similarly, the rightmost pixel area (fourth column, fourth row) of each of tables 48 and 50 indicates a tree (T), and this matches the undistorted indications in tables 44 and 46, respectively. Thus, both sets of image data are retained.

The latter process isolates the undistorted portions of images in the distorted imagery, and begins an undistorted imagery construction process in time, as the undistorted portions of the imagery move about in the individual hyperstereo image pairs.

While preferred forms and arrangements have been shown in illustrating the invention, it is to be understood that various changes and modifications may be made without departing from the spirit and scope of this disclosure.

What is claimed is:

1. A passive method of mitigating image distortion due to moderate to strong optical turbulence in a surveillance system, comprising:

(a) providing an array of cameras each having a narrow field of view forming a stereo camera array, said cameras separated by at least one meter and having incorporated high power magnifying optics therein;

(b) employing the stereo camera array to view a distant object and background to obtain multiple uncoupled, optical turbulence distorted, multi-hyperstereo image data; and (c) processing in real time said multiple uncoupled, optical turbulence distorted, multi-hyperstereo image data in accordance with statistical comparison and integration techniques to mitigate the effects of optical turbulence in near real-time.

2. The method of claim 1, wherein step (c) comprises comparing multi-hyperstereo images with uncorrelated optical turbulence distortions.

3. The method of claim 1, further comprising step (d) of reconstructing the distant object and background.

4. The method of claim 3, wherein step (d) comprises segmenting and time-integrating object edges and textures with correlations from subsequent multi-hyperstereo image data to reconstruct a stereo image of the distant object and background with substantial mitigation of distortions due to optical turbulence.

5. The method of claim 4, wherein step (d) comprises executing time-averaging and correlation algorithms.

6. The method of claim 1, wherein step (c) comprises short-time averaging a plurality of frames of imagery data.

7. The method of claim 1, wherein step (c) comprises carrying out a coarse fusion process determined by a solution of correspondence between all imagery stereo pairs.

8. The method of claim 1, wherein step (c) comprises comparing one of individual pixels and individual pixel areas for correspondence solution of a given stereo pair.

9. The method of claim 1, wherein step (c) comprises retaining and merging undistorted portions of image data derived during step (b).

10. The method of claim 1, wherein step (c) comprises producing undistorted images for each of a plurality of images and best stereo pair display based on a comparison of correspondence of all stereo pairs in the multi-hyperstereo image data.

11. A passive system for mitigating image distortion due to moderate to strong optical turbulence in a surveillance system, comprising:

an array of cameras each having a narrow field of view forming a stereo camera array, said cameras separated by at least one meter and having incorporated high power magnifying optics therein;

control means for controlling the stereo camera array to view a distant object and background to obtain multiple uncoupled, optical turbulence distorted, multi-hyperstereo image data; and real time processing means for processing said multiple uncoupled, optical turbulence distorted, multi-hyperstereo image data in accordance with statistical comparison and integration techniques to mitigate the effects of optical turbulence in near real-time.

12. The system of claim 11, wherein said processing means compares multi-hyperstereo images with uncorrelated optical turbulence distortions.

13. The system of claim 11, further comprising reconstruction means for reconstructing the distant object and background.

14. The system of claim 13, wherein said reconstruction means segments and time-integrates object edges and textures with correlations from subsequent multi-hyperstereo image data to reconstruct a stereo image of the distant object and background with substantial mitigation of distortions due to optical turbulence.

15. The system of claim 14, wherein said reconstruction means executes time-averaging and correlation algorithms.

16. The system of claim 11, wherein said processing means short-time averages a plurality of frames of image data.

17. The system of claim 11, wherein said processing means executes a coarse fusion process determined by a solution of correspondence between all imagery stereo pairs.

18. The system of claim 11, wherein said processing means compares one of individual pixels and individual pixel areas for correspondence solution of a given stereo pair.

19. The system of claim 11, wherein said processing means retains and merges undistorted portions of image data derived by said control means.

20. The system of claim 11, wherein said processing means produces undistorted images for each of a plurality of images and best stereo pair display based on a comparison of correspondence of all stereo pairs in the multi-hyperstereo image data.

* * * * *